US011262180B2

(12) United States Patent
Goko et al.

(10) Patent No.: US 11,262,180 B2
(45) Date of Patent: Mar. 1, 2022

(54) POSITION DETECTION DEVICE

(71) Applicant: DENSO CORPORATION, Kariya (JP)

(72) Inventors: Norio Goko, Kariya (JP); Toshihisa Taniguchi, Kariya (JP); Atsushi Sakaida, Kariya (JP); Keiji Okamoto, Kariya (JP); Yoshihiko Shiraishi, Kariya (JP); Masahiro Asano, Kariya (JP)

(73) Assignee: DENSO CORPORATION, Kariya (JP)

( * ) Notice: Subject to any disclaimer, the term of this patent is extended or adjusted under 35 U.S.C. 154(b) by 144 days.

(21) Appl. No.: 16/727,152

(22) Filed: Dec. 26, 2019

(65) Prior Publication Data
US 2020/0132430 A1 Apr. 30, 2020

Related U.S. Application Data

(63) Continuation of application No. PCT/JP2018/019098, filed on May 17, 2018.

(30) Foreign Application Priority Data

Jun. 27, 2017 (JP) .............................. JP2017-124878

(51) Int. Cl.
G01B 7/00 (2006.01)
G01B 7/16 (2006.01)
(Continued)

(52) U.S. Cl.
CPC ............... G01B 7/003 (2013.01); G01B 7/16 (2013.01); G01B 7/30 (2013.01); G01B 21/32 (2013.01);
(Continued)

(58) Field of Classification Search
CPC . G01B 7/003; G01B 7/16; G01B 7/30; G01B 21/32
See application file for complete search history.

(56) References Cited

U.S. PATENT DOCUMENTS 5,642,105 A * 6/1997 Duffy ...................... B21B 31/07
340/682
7,762,119 B2 * 7/2010 Ustanik .................... G01B 7/16
73/1.79
2018/0313725 A1 11/2018 Harada et al.

FOREIGN PATENT DOCUMENTS

JP 2006-284340 A 10/2006
JP 2009-229183 A 10/2009
(Continued)

Primary Examiner — Reena Aurora
(74) Attorney, Agent, or Firm — Harness, Dickey & Pierce, P.L.C.

(57) ABSTRACT

A position detection device, for detecting a change in relative position of a detection object with respect to a reference portion, includes: a base portion immovable with respect to the reference portion; a following portion deformable or movable following relative movement of the detection object with respect to the reference portion; an expandable and contractible member; and a heat flux detection section. The expandable and contractible member is provided between the base portion and the following portion, is made of a material expandable and contractible according to deformation or movement of the following portion, and generates heat during contraction and absorbs heat during expansion. The heat flux detection section is provided to be subjected to heat of the expandable and contractible member, and is configured to detect a heat flux that is a flow of heat between an inside and an outside of the expandable and contractible member.

13 Claims, 15 Drawing Sheets

(51) Int. Cl.
  *G01B 21/32* (2006.01)
  *G01B 7/30* (2006.01)
  *G01D 5/14* (2006.01)
  *G01D 5/347* (2006.01)

(52) U.S. Cl.
  CPC ......... *G01D 5/145* (2013.01); *G01D 5/34707* (2013.01)

(56) References Cited

FOREIGN PATENT DOCUMENTS

| | | | |
|---|---|---|---|
| JP | 4992084 | B2 | 8/2012 |
| JP | 2017-067761 | A | 4/2017 |

\* cited by examiner

POSITION DETECTION DEVICE

CROSS-REFERENCE TO RELATED APPLICATION

The present application is a continuation application of International Application No. PCT/JP2018/019098, filed May 17, 2018, which claims priority to Japanese Patent Application No. 2017-124878 filed Jun. 27, 2017. The contents of these applications are incorporated herein by reference in their entirety.

BACKGROUND

Technical Field

The present disclosure relates to a position detection device.

Background Art

In the prior art, a distortion crack measurement device includes a displacement sensor, two fixing members fixed to both ends of the displacement sensor, and two bases connected to the fixing members respectively, and is capable of detecting a change in relative position of two positions at a certain distance away from each other.

SUMMARY

In the present disclosure, provided is a position detection device as the following. The position detection device, for detecting a change in relative position of a detection object with respect to a reference portion, includes a base portion, a following portion, an expandable and contractible member, and a heat flux detection section. The expandable and contractible member is provided between the base portion and the following portion, is made of a material expandable and contractible according to deformation or movement of the following portion, and generates heat during contraction and absorbs heat during expansion. The heat flux detection section is provided to be subjected to heat of the expandable and contractible member, and is configured to detect a heat flux that is a flow of heat between an inside and an outside of the expandable and contractible member.

BRIEF DESCRIPTION OF THE DRAWINGS

The above object and other objects, features, and advantages of the present disclosure will be further clarified by the following detailed technique with reference to the accompanying drawings, wherein.

DETAILED DESCRIPTION OF THE PREFERRED EMBODIMENTS

Figure 1:
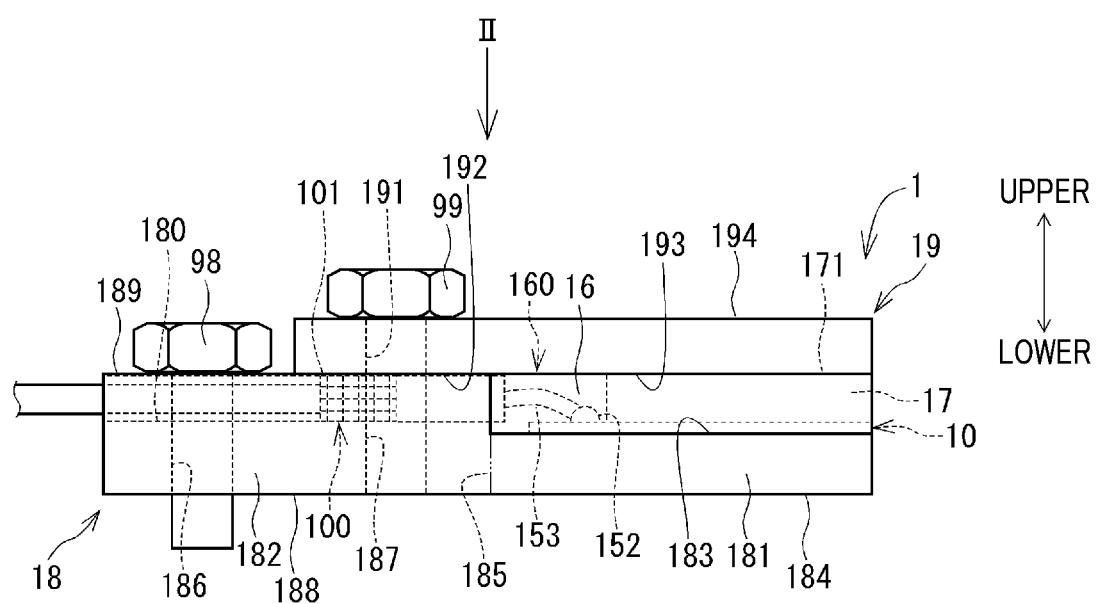
FIG. 1 is a schematic diagram of a position detection device according to a first embodiment.

A position detection device capable of detecting a change in position of a member with respect to a reference portion has been conventionally known. For example, Patent Literature 1 describes a distortion crack measurement device that includes a displacement sensor, two fixing members fixed to both ends of the displacement sensor, and two bases connected to the fixing members respectively and which is capable of detecting a change in relative position of two positions at a certain distance away from each other.

[PTL 1] JP 2009-229183 A

In the distortion crack measurement device described in Patent Literature 1, however, the two bases positioned at a certain distance away from each other are fixed to a detection object, and thus a size of a detected distortion crack may vary depending on a positional relationship between portions to which the respective two bases are fixed. Accordingly, for example, when the distortion crack measurement device is attached to the detection object multiple times in order to examine a place to attach the distortion crack measurement device, an output characteristic varies every time the distortion crack measurement device is attached to the detection object, and thus reproducible data cannot be obtained.

An object of the present disclosure is to provide a position detection device capable of detecting a change in position of a detection object simply and with high reproducibility.

The present disclosure relates to a position detection device for detecting a change in relative position of a detection object with respect to a reference portion, and includes a base portion, a following portion, an expandable and contractible member, and a heat flux detection section.

The base portion is immovable with respect to the reference portion.

The following portion is provided to be deformable or movable following relative movement of the detection object with respect to the reference portion.

The expandable and contractible member is provided between the base portion and the following portion, is made of a material expandable and contractible according to deformation or movement of the following portion, and generates heat during contraction and absorbs heat during expansion.

The heat flux detection section is provided to be subjected to heat of the expandable and contractible member, and is configured to detect a heat flux that is a flow of heat between an inside and an outside of the expandable and contractible member.

In the position detection device of the present disclosure, when the expandable and contractible member generates heat or absorbs heat according to deformation or movement of the following portion with respect to the base portion, a heat flux that is a flow of heat between the inside and the outside of the expandable and contractible member is generated. The heat flux has a certain relationship with a degree of compression or expansion of the expandable and contractible member, i.e., a magnitude and direction of an acting force acting on the expandable and contractible member due to a change in position of the detection object. The position detection device of the present disclosure is capable of detecting a magnitude of the heat flux using the heat flux detection section. Accordingly, the position detection device of the present disclosure is capable of simply detecting an amount and direction of change in relative position of the detection object with respect to the reference portion on the basis of a change in the heat flux.

Furthermore, in the position detection device of the present disclosure, the base portion, the following portion, the expandable and contractible member, and the heat flux detection section are formed as a single unit. Accordingly, the positions of the expandable and contractible member and the heat flux detection section are constant in the unit. Therefore, by fixing the base portion so that the base portion is relatively immovable with respect to the reference portion and providing the following portion so that the following portion can be deformed following relative movement of the detection object with respect to the reference portion, deformation of the following portion with respect to the base portion can be detected with high reproducibility.

As described above, in the position detection device of the present disclosure, the expandable and contractible member generating a heat flux between the inside and the outside of the expandable and contractible member by expansion and contraction, the heat flux detection section capable of detecting a magnitude of the heat flux, the base portion, and the following portion are integrally formed as a unit. Accordingly, the position detection device of the present disclosure is capable of detecting a change in position of the detection object with respect to the reference portion simply and with high reproducibility.

A plurality of embodiments of the present disclosure will be described below with reference to the drawings.

First Embodiment

Figure 5:
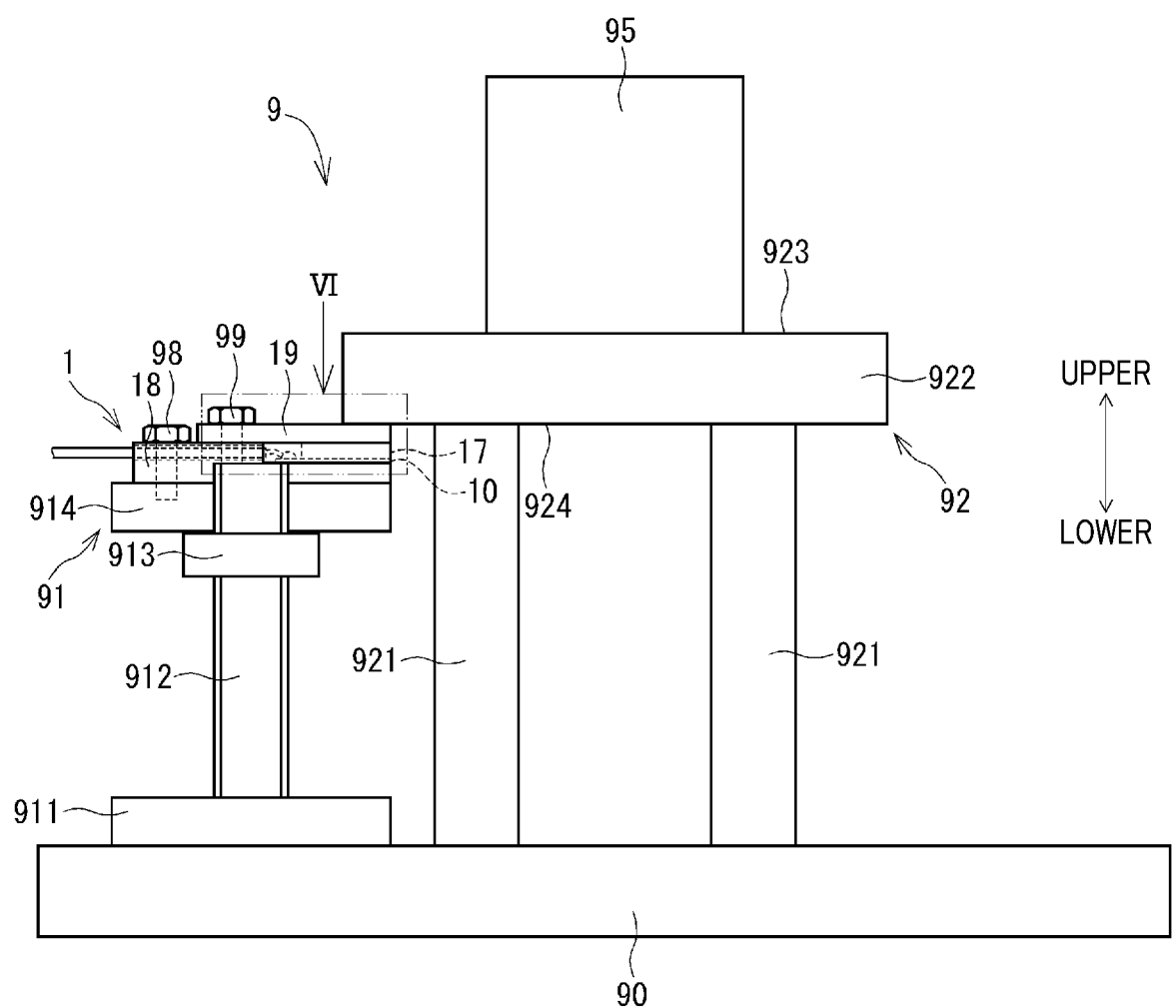
FIG. 5 is a schematic diagram showing operation of the position detection device according to the first embodiment.
Figure 6:
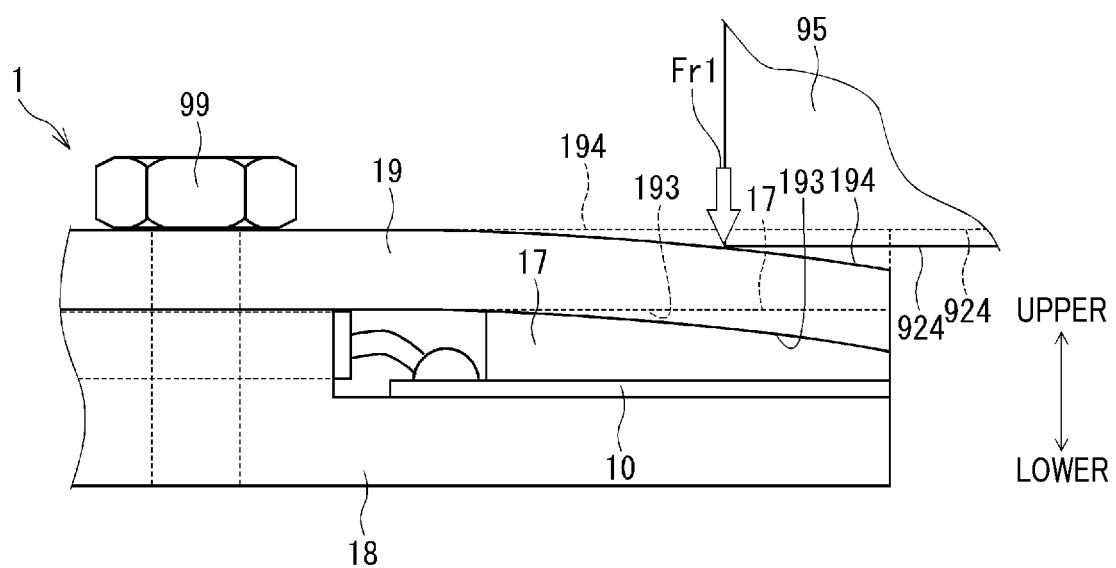
FIG. 6 is an enlarged view of a portion VI in FIG. 5.

A position detection device according to a first embodiment will be described with reference to FIGS. 1 to 6. A position detection device 1 according to the first embodiment includes a base member 18 as a "base portion", a pressing member 19 as a "following portion", an elastic member 17 as an "expandable and contractible member", and a heat flux sensor 10 as a "heat flux detection section". In FIGS. 1 and 6, an upper side and a lower side in the direction of gravity when the position detection device 1 is applied to a position detection system 9 shown in FIG. 5 are referred to as an "upper" side in the vertical direction and a "lower" side in the vertical direction, respectively.

The base member 18 is a member made of a conductive material and having a substantially rectangular parallelepiped shape. The base member 18 has a housing portion 181 and a support portion 182.

The housing portion 181 is a portion having a plate shape and provided on a first end side of the base member 18. The housing portion 181 has the housing surface 183 of the upper side thereof. The base member 18 (the base portion) has a first surface constituting a housing space. The housing space enables the heat flux sensor 10 (described later) to be housed therein. The housing surface 183 serves as the first surface. The housing surface 183 has a larger area than the heat flux sensor 10. The housing portion 181 has an surface 184 of the lower side thereof. The surface 184 abuts a stage portion 914 of a support table 91 (described later).

The support portion 182 is provided on a second end side, which is opposite to the first end side, of the base member 18. And the support portion 182 is provided on a surface 185 that connects the housing surface 183 and the surface 184 of the housing portion 181. The support portion 182 has a through hole 186 into which two bolts 98 as "fixing members" can be inserted and a through hole 187 into which two bolts 99 as "fastening members" can be inserted. The bolts 98 inserted into the through hole 186 are used to fix the base member 18 to the stage portion 914. Accordingly, the base member 18 is immovable with respect to the stage portion 914. The bolts 99 inserted into the through hole 187 are used to fix the base member 18 and the pressing member 19.

The support portion 182 has a larger thickness in a vertical direction than the housing portion 181. An end surface 188 on the lower side of the support portion 182 is formed to be the same plane as the surface 184 of the housing portion 181. Accordingly, the base member 18 is formed so that a portion on the upper side of the housing portion 181 is recessed as compared with the support portion 182. An end surface 189 on the upper side of the support portion 182 abuts the pressing member 19.

The end surface 189 of the support portion 182 has a groove 180 as a "wiring space" through which the housing portion 181 side of the support portion 182 can communicate with a side of the support portion 182 opposite to the housing portion 181.

The pressing member 19 is a member made of a conductive and elastically deformable material and having a flat plate shape. The pressing member 19 is pressed against a mount table 92 as a "detection object" and is provided to be deformable with respect to the base member 18 following movement of the mount table 92. The pressing member 19 is adhered to the elastic member 17, for example, by using an adhesive.

The pressing member 19 has a surface 192 provided on a first end portion. The surface 192 is formed to abut the end surface 189 of the base member 18. The pressing member 19 has a through hole 191 through which the two bolts 99 can be inserted. The pressing member 19 is fixed to the base member 18 by the bolts 99 inserted into the through holes 191 and 187.

The pressing member 19 (the following portion) has a second surface constituting a housing space. The pressing member 19 has a housing surface 193 provided on a second end portion, which is opposite to the first end portion. The housing surface 193 serves as the second surface. The housing surface 193 is located at a position facing the housing surface 183 of the base member 18. Accordingly, a housing space 160 capable of housing the elastic member 17 and the heat flux sensor 10 is formed between the housing surface 183 of the base member 18 and the housing surface 193 of the pressing member 19. The housing space 160 communicates with the groove 180.

The elastic member 17 is, for example, a member made of Viton rubber and having a substantially flat plate shape. The elastic member 17 is provided in the housing space 160. One surface 171 of the elastic member 17 is adhered to the housing surface 193 of the pressing member 19. According to deformation of the pressing member 19, the elastic member 17 generates heat during contraction and absorbs heat during expansion.

The heat flux sensor 10 is provided between the elastic member 17 and the base member 18. The heat flux sensor 10 is adhered to the elastic member 17 and the base member 18, for example, by using an adhesive. The heat flux sensor 10 is a member having flexibility and is deformable according to expansion and contraction of the elastic member 17. A heat flux that is a flow of heat between an inside and an outside of the elastic member 17 passes through the heat flux sensor 10. The heat flux sensor 10 is a sensor capable of detecting a heat flux crossing the heat flux sensor 10. The heat flux sensor 10 outputs the detected heat flux, for example, as a voltage signal.

Figure 3:
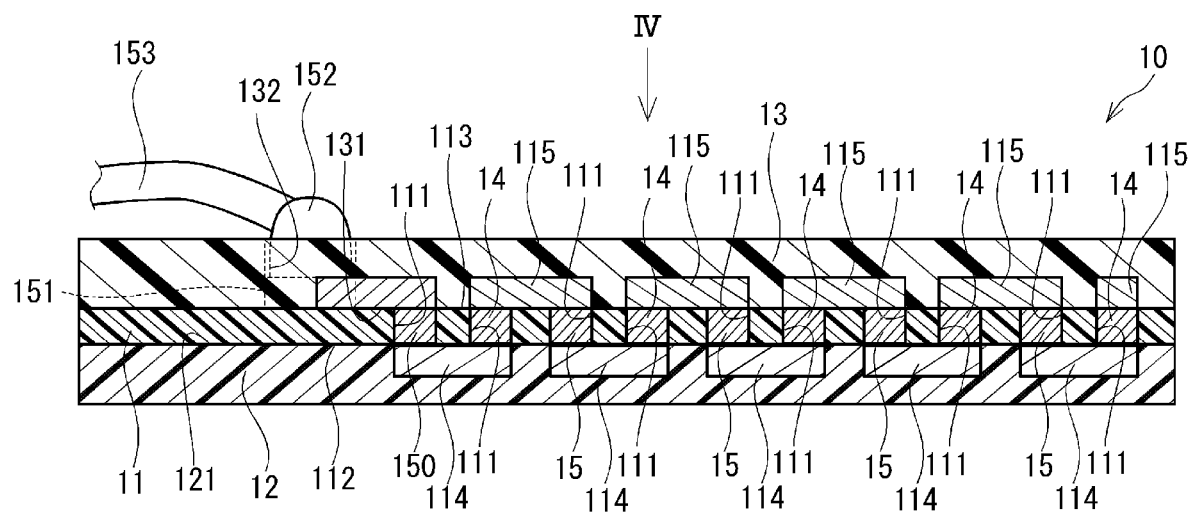
FIG. 3 is a cross-sectional view of a heat flux sensor of the position detection device according to the first embodiment.

As shown in FIG. 3, the heat flux sensor 10 includes an insulating substrate 11, a back surface protective member 12, a front surface protective member 13, a first interlayer connecting member 14, and a second interlayer connecting member 15. In FIG. 3, in order to facilitate understanding of a configuration of the heat flux sensor 10, a shape of the heat flux sensor 10 in a direction from the back surface protective member 12 toward the front surface protective member 13 is enlarged as compared with an actual shape.

The insulating substrate 11 is composed of a film made of a thermoplastic resin. The insulating substrate 11 has a plurality of via holes 111 passing through the insulating substrate 11 in a thickness direction. In each of the via holes 111, a first interlayer connecting member 14 or a second interlayer connecting member 15 is provided. The via holes 111 in which the second interlayer connecting member 15 is provided are each located next to a via hole 111 in which a first interlayer connecting member 14 is provided. Thus, in the insulating substrate 11, the first interlayer connecting members 14 and the second interlayer connecting members 15 are alternately arranged spaced apart from each other.

The back surface protective member 12 is composed of a film made of a thermoplastic resin and having the same size as the insulating substrate 11. The back surface protective member 12 is provided on a back surface 112 of the insulating substrate 11. A plurality of back surface patterns 114 in which copper foil or the like is patterned is provided between the back surface 112 of the insulating substrate 11 and a surface 121 on the insulating substrate 11 side of the back surface protective member 12. The back surface pattern 114 electrically connects the first interlayer connecting member 14 to the second interlayer connecting member 15.

The front surface protective member 13 is composed of a film made of a thermoplastic resin and having the same size as the insulating substrate 11. The front surface protective member 13 is provided on a front surface 113 of the insulating substrate 11. A plurality of front surface patterns 115 in which copper foil or the like is patterned is formed between the front surface 113 of the insulating substrate 11 and a surface 131 on the insulating substrate 11 side of the front surface protective member 13. The front surface patterns 115 electrically connects the first interlayer connecting members 14 to the second interlayer connecting members 15.

The plurality of first interlayer connecting members 14 and the plurality of second interlayer connecting members 15 are composed of respective different metals to exert the Seebeck effect. For example, Each of the first interlayer connecting members 14 is composed of a metal compound; the metal compound has been obtained by solid-phase sintering powders of Bi—Sb—Te alloy constituting a P-type semiconductor. The metal compound of each of the first interlayer connecting members has maintained a crystal structure of metal atoms of the Bi—Sb—Te alloy. Furthermore, the second interlayer connecting members 15 are composed of a metal compound obtained by solid-phase sintering Bi—Te alloy powder constituting a N-type thermoelectric material so as to maintain a predetermined crystal structure of a plurality of metal atoms before the sintering. The first interlayer connecting members 14 and the second interlayer connecting members 15 are connected in series by the back surface pattern 114 and the front surface pattern 115.

Figure 4:
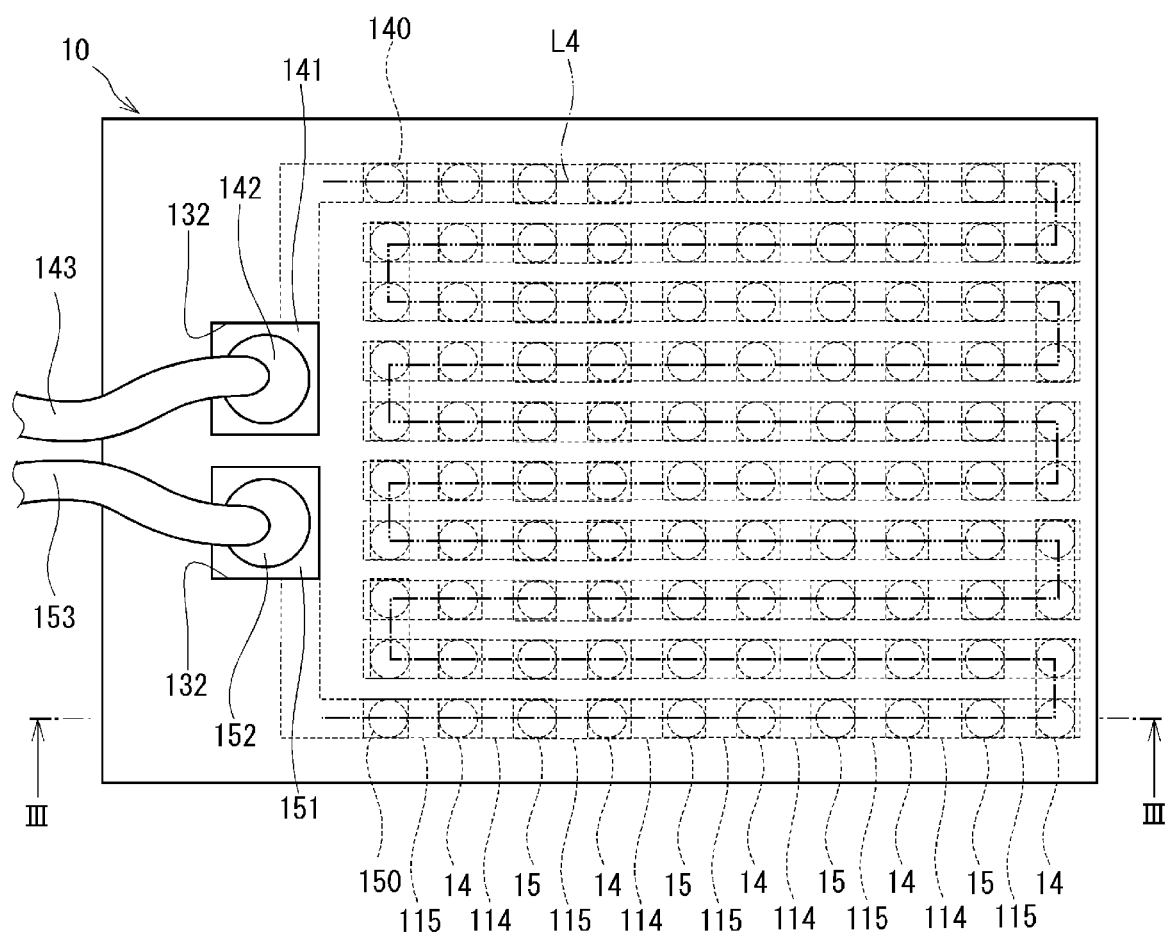
FIG. 4 is a diagram as viewed from a direction indicated by arrow IV in FIG. 3.

As shown in FIGS. 3 and 4, one first interlayer connecting member 140 of the plurality of first interlayer connecting members 14 is electrically connected to a terminal 141. Furthermore, one second interlayer connecting member 150 of the plurality of second interlayer connecting members 15 is electrically connected to a terminal 151. As shown in FIG. 4, in the single heat flux sensor 10, the terminals 141 and 151 are located at both ends of the connection in which the back surface patterns 114, the first interlayer connecting members 14, the front surface patterns 115, and the second interlayer connecting members 15 are connected to each other to form a meandering shape (see two dot dash line L4 in FIG. 4). The terminals 141 and 151 are exposed to the outside through an opening 132 of the front surface protective member 13.

Figure 2:
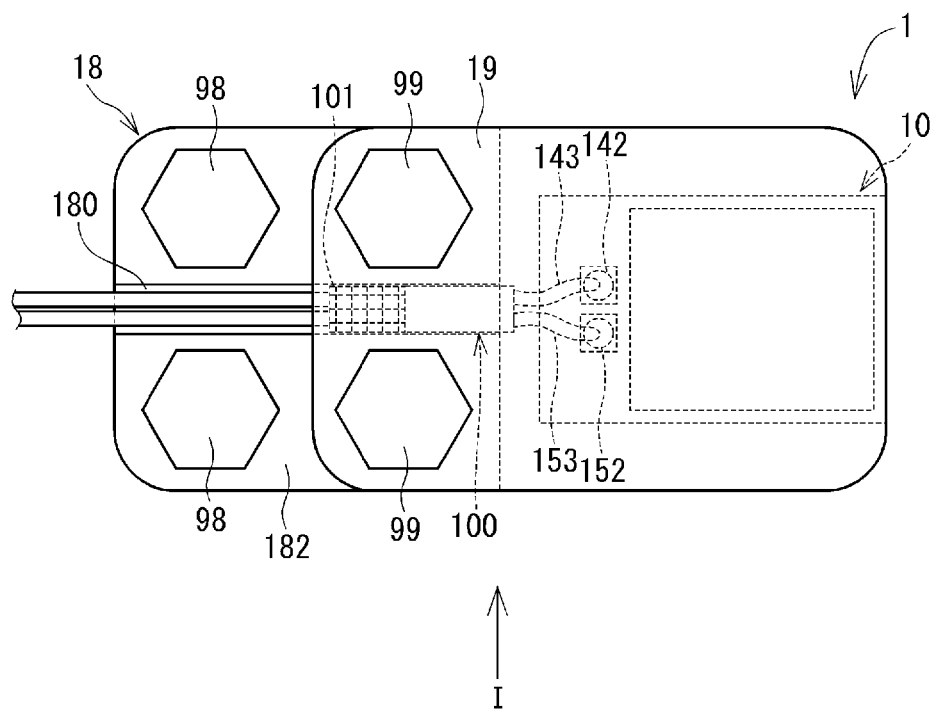
FIG. 2 is a diagram as viewed from a direction indicated by arrow II in FIG. 1.

The terminal 141 is electrically connected to an output line 143 as an "electric wiring" via a connection bump 142. Furthermore, the terminal 151 is electrically connected to an output line 153 as the "electric wire" via a connection bump 152. The output line 143 and the output line 153 are bundled as a single cable 100. As shown in FIGS. 1 and 2, the cable 100 is housed in the groove 180. The cable 100 is in the form of so-called coaxial cable. A ground wire 101 of the heat flux sensor 10 is arranged as a braided copper wire around the output lines 143 and 153. In this case, the ground wire 101 is provided in the groove 180 and is sandwiched between the base member 18 and the pressing member 19.

In the heat flux sensor 10, when a change occurs in an amount of heat flowing in a thickness direction of the heat flux sensor 10 (direction from the back surface protective member 12 toward the front surface protective member 13 in FIG. 3), a change occurs in an electromotive voltage generated in the first interlayer connecting members 14 and the second interlayer connecting members 15 alternately connected in series. In the heat flux sensor 10, the voltage is outputted as a detection signal to the outside through the output lines 143 and 153. A magnitude of the heat flux passing through the heat flux sensor 10 is calculated on the basis of the detection signal.

In the housing space 160, the elastic member 17 and the heat flux sensor 10 are sealed by a sealing portion 16. This makes it possible to prevent the elastic member 17 and the heat flux sensor 10 from being broken by an unexpected external force.

Next, operation of the position detection device 1 according to the first embodiment will be described with reference to FIGS. 5 and 6.

FIG. 5 is a schematic diagram showing a state where a detection object 95 which is a target for which detection is to be performed is set in the position detection system 9. The position detection system 9 includes a base 90 as a "reference portion", the support table 91, the mount table 92, the position detection device 1, and the like. The detection object 95 is, for example, a driving device such as a robot or a single-axis loader, and the position detection system 9 is capable of detecting a change in position of a motor of the detection object 9 due to vibration associated with driving 5.

The base 90 is a member fixed to a floor or the like. The base 90 serves as a reference portion for a change in position of the detection object 95. The support table 91 and the mount table 92 are provided on the base 90.

The support table 91 supports the position detection device 1 so that the position detection device 1 is located at a predetermined position on the base 90. The support table 91 has a base part 911, a leg portion 912, a slider 913, and a stage portion 914.

The base part 911 is fixed to the base 90.

The leg portion 912 is formed to extend upward from the base part 911. The slider 913 is provided on the leg portion 912. The slider 913 is provided on the leg portion 912 to be movable in the direction in which the leg portion 912 extends. The slider 913 supports the stage portion 914 from the lower side and can change a distance between the base part 911 and the stage portion 914.

The stage portion 914 is provided on the leg portion 912. The stage portion 914 has a screw hole into which the bolts 98 can be screwed. Accordingly, the stage portion 914 can fix the base member 18 so that the base member 18 is relatively immovable with respect to the base 90.

The mount table 92 supports the detection object 95 so that the detection object 95 is located at a predetermined position on the base 90. The mount table 92 has two leg portions 921 and a stage portion 922.

The leg portions 921 are formed to extend upward from the base 90.

The stage portion 922 is provided at ends on the upper sides of the two leg portions 921, respectively. The detection object 95 is placed on a placing surface 923 on the upper side of the stage portion 922.

In the first embodiment, the position detection device 1 is provided so that an abutting surface 194 on the top side of the pressing member 19 abuts an end surface 924 on the lower side of the mount table 92.

When a position of the stage portion 922 with respect to the base 90 is changed by vibration or the like of the detection object 95 on the mount table 92, a force caused by the change in position acts on the pressing member 19 abutting the stage portion 922. By the acting force caused by the change in position, the pressing member 19 is deformed and a distance between the housing surface 183 and the housing surface 193 is changed. When the distance between the housing surface 183 and the housing surface 193 is changed, the elastic member 17 is compressed or expanded. Operation of the position detection device 1 at this time will be described with reference to FIG. 6.

FIG. 6 shows an enlarged view of a portion around the elastic member 17 provided in the position detection system 9. In FIG. 6, for the purpose of comparing a state before deformation of the elastic member 17 with a state after the deformation of the elastic member 17, the sealing portion 16 is omitted. In FIG. 6, a dotted line indicates the state before the deformation of the elastic member 17 and a solid line indicates the state after the deformation of the elastic member 17.

For example, as shown in FIG. 6, when, by an acting force Fr1 caused by a change in position of the detection object 95, the space between the housing surface 183 and the housing surface 193 is reduced and the elastic member 17 is compressed, heat is generated inside the elastic member 17. When heat is generated inside the elastic member 17, a heat flux from the inside toward the outside of the elastic member 17 is generated. The heat flux sensor 10 detects a magnitude of the heat flux.

When, due to the change in position of the detection object 95, the space between the housing surface 183 and the housing surface 193 is increased and the elastic member 17 is expanded, the elastic member 17 absorbs heat, and thus a heat flux from the outside toward the inside of the elastic member 17 is generated. The heat flux sensor 10 detects a magnitude of the heat flux.

On the basis of the magnitude and the direction of the flow of the heat flux detected in this manner, the position detection device 1 calculates an amount and direction of the change in position, with respect to the base 90, of the detection object 95 moving integrally with the stage portion 922.

(a) In the position detection device 1 according to the first embodiment, when the elastic member 17 generates heat or absorbs heat according to deformation of the pressing member 19 with respect to the base member 18, a heat flux that is a flow of heat between the inside and the outside of the elastic member 17 is generated. The heat flux has a certain relationship with a degree of compression or expansion of the elastic member 17, i.e., a magnitude and direction of an acting force acting on the elastic member 17 due to a change in position of the detection object 95. The position detection device 1 is capable of detecting a magnitude of the heat flux by the heat flux sensor 10. Accordingly, the position detection device 1 is capable of simply detecting an amount and direction of change in relative position of the detection object 95 with respect to the base 90 on the basis of a change in the heat flux.

Furthermore, in the position detection device 1, the base member 18, the pressing member 19, the elastic member 17, and the heat flux sensor 10 are formed as a single unit. Accordingly, the positions of the elastic member 17 and the heat flux sensor 10 are constant in the unit. Therefore, by fixing the base member 18 so that the base member 18 is immovable with respect to the base 90 and providing the pressing member 19 so that the pressing member 19 can be deformed following relative movement of the detection object 95 with respect to the base 90, deformation of the pressing member 19 with respect to the base member 18 can be detected with high reproducibility.

Thus, in the position detection device 1 according to the first embodiment, the elastic member 17 generating a heat flux between the inside and the outside of the elastic member 17 by expansion and contraction, the heat flux sensor 10 capable of detecting a magnitude of the heat flux, the base member 18, and the pressing member 19 are integrally formed as a unit. Accordingly, the position detection device 1 according to the first embodiment is capable of detecting a change in position of the detection object 95 with respect to the base 90 simply and with high reproducibility.

(b) In the position detection device 1 according to the first embodiment, the elastic member 17 and the heat flux sensor 10 are housed in the housing space 160. Furthermore, the elastic member 17 and the heat flux sensor 10 in the housing space 160 are sealed by the sealing portion 16. This makes it possible to prevent the elastic member 17 and the heat flux sensor 10 from being damaged by an unexpected acting force acting on the position detection device 1.

(c) The position detection device 1 according to the first embodiment is fixed, by the bolts 98, to the stage portion 914 fixed to the base 90. Thus, when the position detection device 1 is placed on the stage portion 914, the position detection device 1 can be provided at a predetermined position. This can further improve reproducibility of a detection result of a change in position of the detection object 95 with respect to the base 90.

(d) In the position detection device 1 according to the first embodiment, an initial elastic deformation amount of the elastic member 17 can be adjusted by changing the distance between the housing surface 183 and the housing surface 193. When the deformation amount of the elastic member 17 is large, the elastic member 17 is hard and thus can follow a sudden change in position. On the other hand, when an acting force caused by a change in position of the detection object 95 is weak, deformation is less likely to occur and thus the heat flux sensor 10 outputs a smaller voltage.

Accordingly, in the position detection device 1, when the acting force caused by the change in position of the detection object 95 is weak and the change occurs slowly, the space between the housing surface 183 and the housing surface 193 is adjusted to be relatively wide so that the initial deformation amount of the elastic member 17 becomes small. When the acting force caused by the change in position of the detection object 95 is strong and the change occurs rapidly, the space between the housing surface 183 and the housing surface 193 is adjusted to be relatively narrow so that the initial deformation amount of the elastic member 17 becomes large.

In this manner, in the position detection device 1, the space between the housing surface 183 and the housing surface 193 is adjusted according to a characteristic of the acting force caused by the change in position of the detection object 95. This makes it possible to reliably detect a change in position of the detection object 95.

(e) In the position detection device 1, the pressing member 19 is made of the elastically deformable material. When the elastic member 17 is deformed by an acting force caused by a change in position of the detection object 95 and then the acting force is lost, the elastic member 17 is returned to its original shape by not only a restoring force of the elastic member 17 itself but also a restoring force to return to its original shape of the pressing member 19 adhered to the elastic member 17. Accordingly, after the deformation, the elastic member 17 is restored to the original shape relatively faster. Thus, even when a direction in which the acting force acts repeatedly changes in a relatively short time, the elastic member 17 can be deformed following the change. This makes it possible to reliably detect a change in position of the detection object 95 repeated in a relatively short time.

(f) In the position detection device 1, the ground wire 101 of the heat flux sensor 10 is provided in the groove 180 to be sandwiched between the base member 18 and the pressing member 19. This eliminates the need for a portion to which a ground wire of the detection object 95 is to be connected. Furthermore, the ground wire 101 is grounded at the same position in the heat flux sensor 10, and thus the ground wire 101 can eliminate noise of a voltage signal outputted from the heat flux sensor 10. This makes it possible to further improve detection accuracy of a change in position of the detection object 95.

Second Embodiment

Next, a position detection device according to a second embodiment will be described with reference to FIGS. 7 and 8. The second embodiment differs from the first embodiment in the configuration of the following portion. Portions substantially the same as those of the first embodiment are given the same reference numerals, and description of such portions is omitted.

Figure 7:
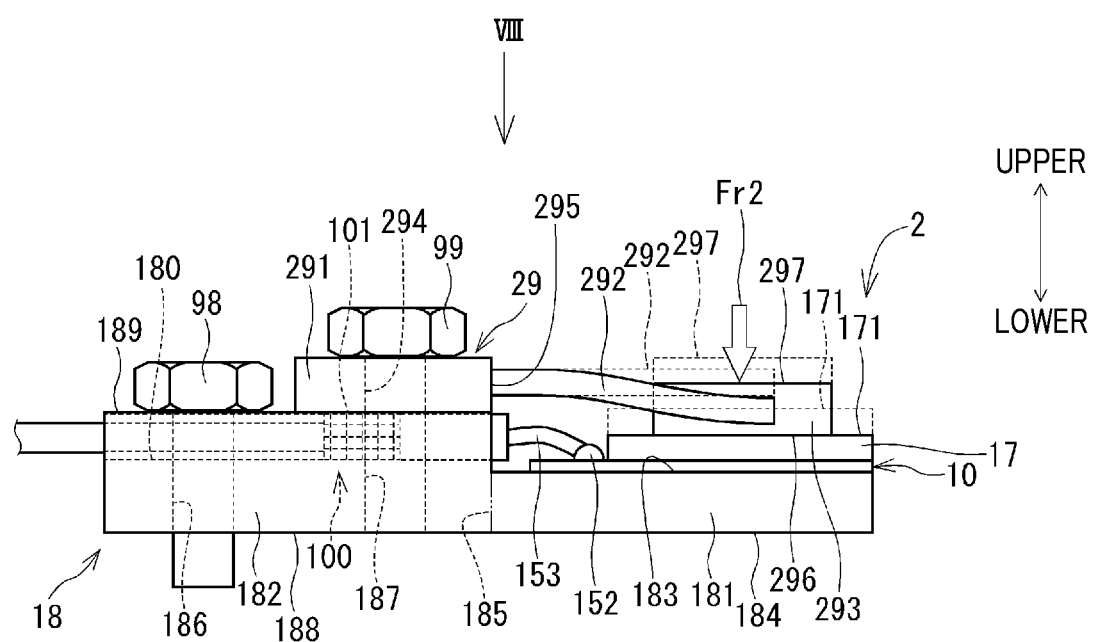
FIG. 7 is a schematic diagram of a position detection device according to a second embodiment.
Figure 8:
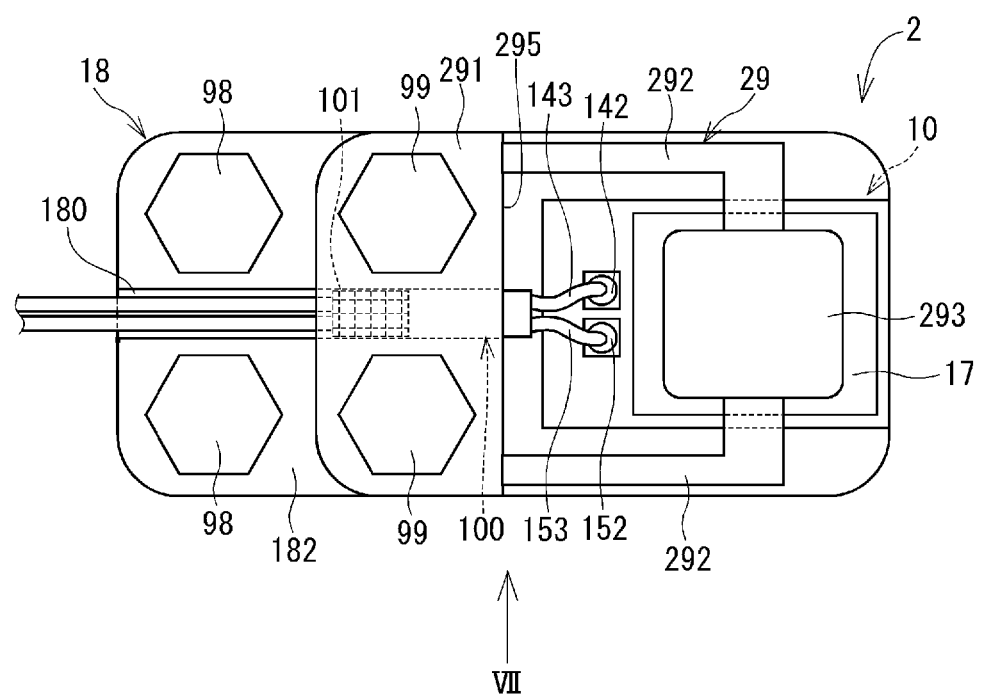
FIG. 8 is a diagram as viewed from a direction indicated by arrow VIII in FIG. 7.

As shown in FIGS. 7 and 8, a position detection device 2 according to the second embodiment includes the base member 18, a pressing member 29 as the "following portion", the elastic member 17, and the heat flux sensor 10. In FIG. 7, an upper side and a lower side in the direction of gravity when the position detection device 2 is applied to the position detection system 9 are referred to as an "upper" side in the vertical direction and a "lower" side in the vertical direction, respectively.

The pressing member 29 has a fixing portion 291, two arm portions 292 as "deformable portions", and an abutting portion 293 as a "movable portion". The pressing member 29 is provided to the base member 18 deformably while the pressing member 29 abuts the mount table 92.

The fixing portion 291 is a portion having a substantially flat plate shape. The fixing portion 291 is provided on the end surface 189 of the support portion 182. The fixing portion 291 has a through hole 294 through which the two bolts 99 can be inserted. The fixing portion 291 is fixed to the base member 18 by the bolts 99 inserted into the through holes 294 and 187.

The two arm portions 292 are provided on an end surface 295 on the heat flux sensor 10 side of the fixing portion 291. The two arm portions 292 are made of an elastically deformable material and have a substantially L-shape. Each of the two arm portions 292 has a side connected to the fixing portion 291 and a side opposite to the side connected to the fixing portion 291. The sides opposite to the sides connected to the fixing portion 291, of the two arm portions 292, are formed to sandwich the abutting portion 293.

The abutting portion 293 is a portion having a flat plate shape and having a smaller area than the fixing portion 291. The pressing member 29 (the following portion) has a second surface constituting a housing space. The abutting portion 293 has a surface 296 of the lower side thereof, which serves as the second surface. The entire surface of the surface 296 is adhered to the surface 171 of the elastic member 17, for example, by using an adhesive. The abutting portion 293 has a surface 297 of the upper side thereof. The surface 297 abuts the end surface 924 of the mount table 92.

As shown in FIG. 7, in the position detection device 2 according to the second embodiment, when an acting force Fr2 acts on the abutting portion 293 due to a change in position of the detection object 95, the arm portions 292 are deformed. Accordingly, while the entire surface of the surface 296 abuts the surface 171 of the elastic member 17, the abutting portion 293 moves parallel to a direction in which the acting force Fr2 acts. At this time, an entire portion of the elastic member 17 is deformed according to a magnitude of the acting force Fr2. Thus, the elastic member 17 absorbs heat or generates heat according to the magnitude of the acting force Fr2. Therefore, the second embodiment yields the same effects as the effects (a) and (c) to (f) of the first embodiment, and can further improve detection accuracy of a change in position of the detection object 95.

Third Embodiment

Figure 9:
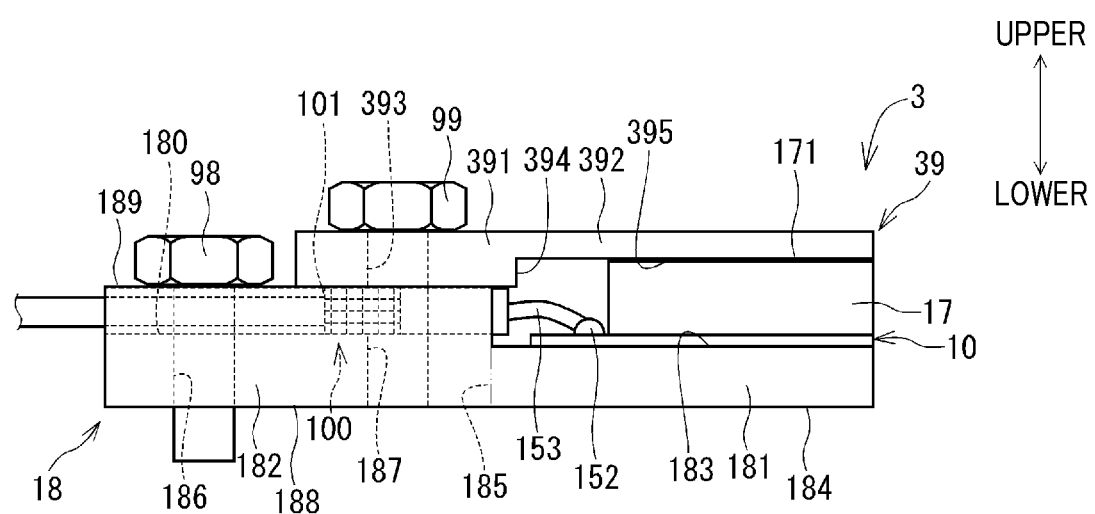
FIG. 9 is a schematic diagram of a position detection device according to a third embodiment.

Next, a position detection device according to a third embodiment will be described with reference to FIG. 9. The third embodiment differs from the first embodiment in the configuration of the following portion. Portions substantially the same as those of the first embodiment are given the same reference numerals, and description of such portions is omitted.

A position detection device 3 according to the third embodiment includes the base member 18, a pressing member 39 as the "following portion", the elastic member 17, and the heat flux sensor 10. In FIG. 9, an upper side and a lower side in the direction of gravity when the position detection device 3 is applied to the position detection system 9 are referred to as a "upper" side in the vertical direction and a "lower" side in the vertical direction, respectively.

The pressing member 39 has a fixing portion 391 and a thin plate portion 392. The fixing portion 391 and the thin plate portion 392 are integrally formed of a conductive and elastically deformable material.

The fixing portion 391 is a portion having a substantially flat plate shape. The fixing portion 391 is provided on the end surface 189 of the support portion 182. The fixing portion 391 has a through hole 393 through which the two bolts 99 can be inserted. The fixing portion 391 is fixed to the base member 18 by the bolts 99 inserted into the through holes 393 and 187.

The thin plate portion 392 is provided on an end surface 394 on the heat flux sensor 10 side of the fixing portion 391. The thin plate portion 392 is formed to have a smaller thickness in the vertical direction than the fixing portion 391. An end surface 395 on the lower side of the thin plate portion 392 is adhered to the surface 171 of the elastic member 17, for example, by using an adhesive.

In the position detection device 3 according to the third embodiment, the thin plate portion 392 on which an acting force caused by a change in position of the detection object 95 acts is formed to have a relatively small thickness. Accordingly, the elastic member 17 is deformed by even a small acting force, and the elastic member 17 absorbs heat or generates heat. Therefore, the third embodiment yields the same effects as the effects (a) and (c) to (f) of the first embodiment, and can further improve detection accuracy of a change in position of the detection object 95.

Furthermore, in the position detection device 3, the fixing portion 391 connected to the thin plate portion 392 and fixed to the base member 18 is formed to have a relatively large thickness in the vertical direction. Accordingly, the pressing member 39 can be reliably fixed to the base member 18 while detection accuracy of a change in position of the detection object 95 is further improved by the thin plate portion 392 having a relatively small thickness in the vertical direction. This makes it possible to prevent the position detection device 3 from being broken by an acting force caused by a change in position of the detection object 95.

Fourth Embodiment

Figure 10:
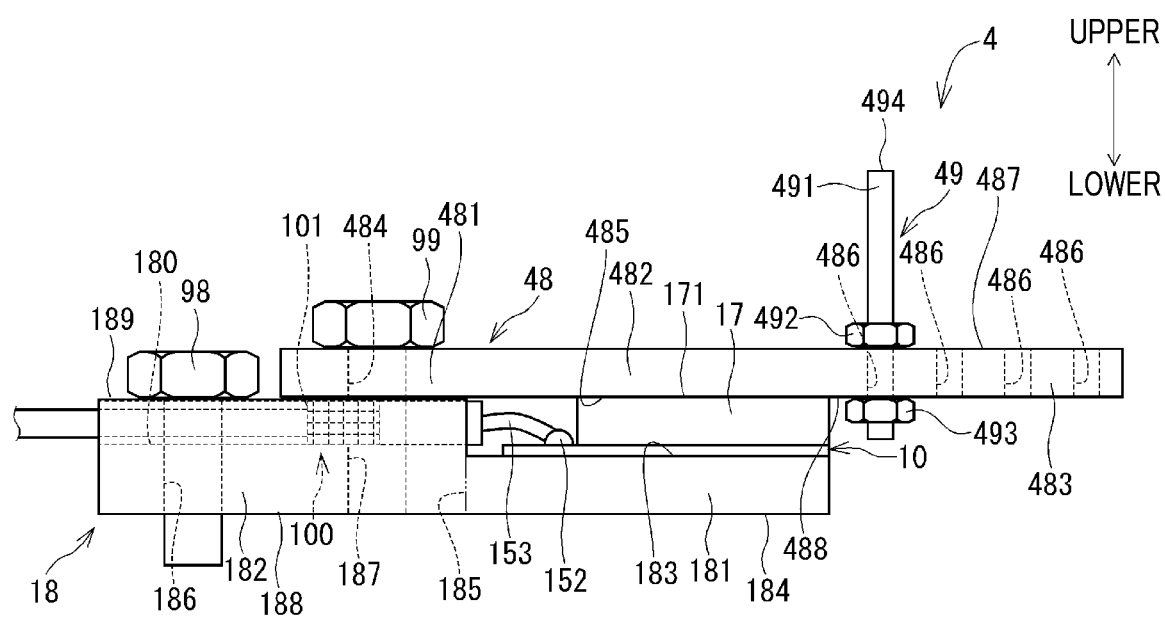
FIG. 10 is a schematic diagram of a position detection device according to a fourth embodiment.

Next, a position detection device according to a fourth embodiment will be described with reference to FIG. 10. The fourth embodiment differs from the first embodiment in the configuration of the following portion. Portions substantially the same as those of the first embodiment are given the same reference numerals, and description of such portions is omitted.

A position detection device 4 according to the fourth embodiment includes the base member 18, a support member 48 as the "following portion", a pressing member 49 as the "following portion" and a "length adjustment section", the elastic member 17, and the heat flux sensor 10. In FIG. 10, an upper side and a lower side in the direction of gravity when the position detection device 4 is applied to the position detection system 9 are referred to as an "upper" side in the vertical direction and a "lower" side in the vertical direction, respectively.

The support member 48 is a member made of a conductive and elastically deformable material and having a flat plate shape. The support member 48 has a fixing portion 481, an abutting portion 482, and a support portion 483.

The fixing portion 481 is provided on the end surface 189 of the support portion 182. The fixing portion 481 has a through hole 484 through which the two bolts 99 can be inserted. The fixing portion 481 is fixed to the base member 18 by the bolts 99 inserted into the through holes 484 and 187.

The abutting portion 482 is provided on the heat flux sensor 10 side of the fixing portion 481. The abutting portion 482 has an end surface 485 as the "end surface of the following portion forming the housing space" on the lower side. The end surface 485 is adhered to the surface 171 of the elastic member 17, for example, by using an adhesive.

The support portion 483 is provided on a side opposite to the fixing portion 481, of the abutting portion 482. The support portion 483 has a plurality of through holes 486 through which the pressing member 49 can be inserted. The plurality of through holes 486 are formed to be arranged in a direction away from the abutting portion 482.

The pressing member 49 has a bar member 491 and two nuts 492 and 493.

The bar member 491 is inserted through one of the plurality of through holes 486 of the support portion 483. A screw groove is formed on an outer wall on an outer side in a radial direction of the bar member 491.

The two nuts 492 and 493 are provided to be engaged with the screw groove of the bar member 491 inserted through the through hole 486. While being engaged with the screw groove of the bar member 491, the nut 492 can abut a surface 487 on the upper side of the support portion 483. While being engaged with the screw groove of the bar member 491, the nut 493 can abut a surface 488 on the lower side of the support portion 483.

In the pressing member 49, when the bar member 491 is fixed at a predetermined position, the support portion 483 is sandwiched between the two nuts 492 and 493. Accordingly, a distance from an abutting surface 494 on the upper side of the bar member 491 to the surface 487 of the support portion 483 can be changed so that the abutting surface 494 of the bar member 491 abuts the end surface 924 of the mount table 92.

In the position detection device 4 according to the fourth embodiment, a height of the abutting surface 494 of the pressing member 49 is adjusted according to a degree of change in position of the detection object 95 so that an output characteristic of the heat flux sensor 10 can be optimized in the detection of a change in position of the detection object 95. Therefore, the fourth embodiment yields the same effects as the effects (a) and (c) to (f) of the first embodiment, and can further improve detection accuracy of a change in position of the detection object 95.

Furthermore, in the position detection device 4, the plurality of through holes 486 of the support portion 483 are formed to be arranged in the direction away from the abutting portion 482. This makes it possible to adjust a position in a horizontal direction of the pressing member 49 according to a positional relationship between the stage portion 914 of the support table 91 and the stage portion 922 of the mount table 92 so that the pressing member 49 reliably abuts the stage portion 922. This makes it possible to reliably detect a change in position of the detection object 95.

Fifth Embodiment

Figure 11:
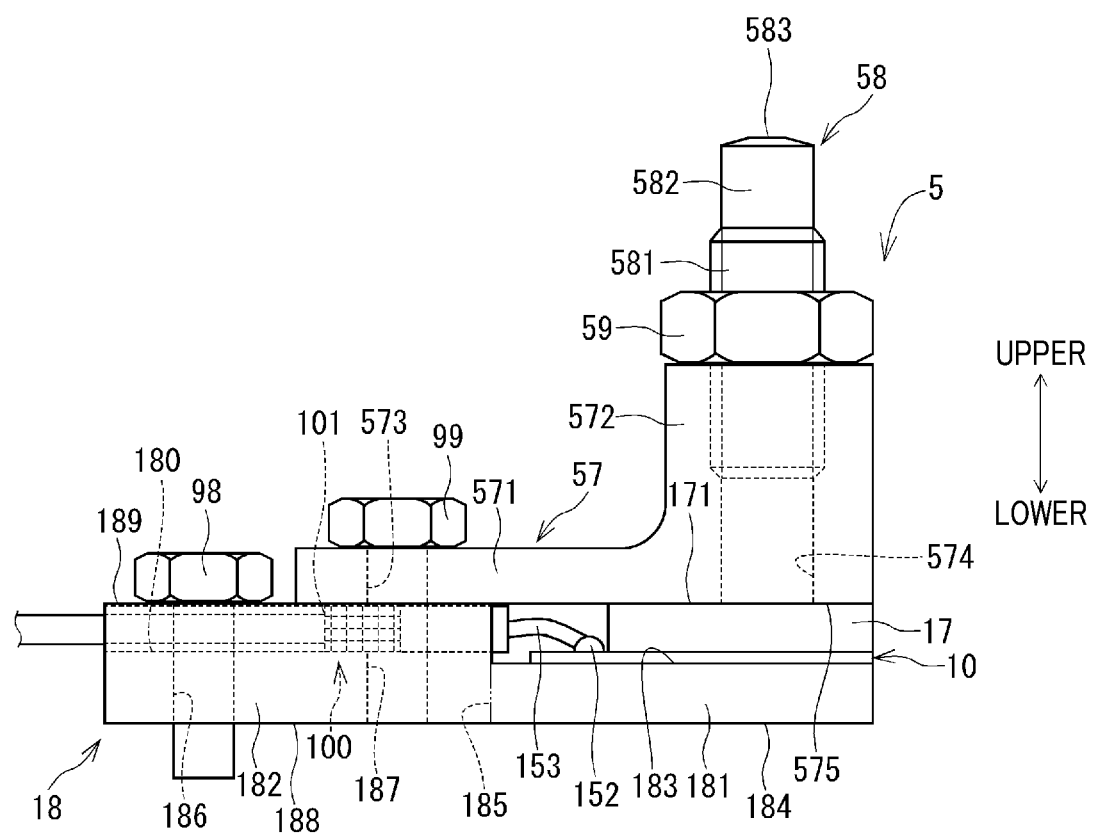
FIG. 11 is a schematic diagram of a position detection device according to a fifth embodiment.

Next, a position detection device according to a fifth embodiment will be described with reference to FIG. 11. The fifth embodiment differs from the first embodiment in the configuration of the following portion. Portions substantially the same as those of the first embodiment are given the same reference numerals, and description of such portions is omitted.

A position detection device 5 according to the fifth embodiment includes the base member 18, a support member 57 as the "following portion", a pressing member 58 as the "following portion" and the "length adjustment section", a nut 59 as the "following portion" and the "length adjustment section", the elastic member 17, and the heat flux sensor 10. In FIG. 11, an upper side and a lower side in the direction of gravity when the position detection device 5 is applied to the position detection system 9 are referred to as an "upper" side in the vertical direction and a "lower" side in the vertical direction, respectively.

The support member 57 has a fixing portion 571, and a screw hole portion 572 as the "length adjustment section". The fixing portion 571 and the screw hole portion 572 are integrally formed of a conductive and elastically deformable material. The support member 57 supports the pressing member 58.

The fixing portion 571 is a portion having a substantially flat plate shape. The fixing portion 571 is provided on the end surface 189 of the support portion 182. The fixing portion 571 has a through hole 573 through which the two bolts 99 can be inserted. The fixing portion 571 is fixed to the base member 18 by the bolts 99 inserted into the through holes 573 and 187.

The screw hole portion 572 is provided on the heat flux sensor 10 side of the fixing portion 571 and on the upper side of the elastic member 17. The screw hole portion 572 has a screw hole 574 that passes through the screw hole portion 572 in a direction substantially perpendicular to the surface 171 of the elastic member 17. The support member 57 (the following portion) has a second surface constituting the housing space. The screw hole portion 572 has a surface 575 of the lower side thereof, which serves as the second surface. The surface 575 is adhered to the surface 171 of the elastic member 17, for example, by using an adhesive.

The pressing member 58 has a screw portion 581 and an abutting portion 582.

The screw portion 581 has a substantially bar shape. A screw thread is formed on an outer wall on an outer side in a radial direction of the screw portion 581. In the state inserted into the screw hole portion 572, the screw portion 581 is engaged with a screw thread formed on an inner wall of the screw hole portion 572.

The abutting portion 582 is provide on the upper side of the screw portion 581. The abutting portion 582 is formed so that an abutting surface 583 on the upper side of the abutting portion 582 can abut the end surface 924 of the mount table 92.

The nut 59 is provided on the outer side in the radial direction of the screw portion 581 of the pressing member 58. A relative position of the pressing member 58 with respect to the support member 57 is determined by a position of the nut 59 at which the screw portion 581 is screw-fastened to the nut 59. Thus, a length of a portion of the pressing member 58 protruding from the screw hole portion 572 can be adjusted by using the nut 59.

In the position detection device 5 according to the fifth embodiment, the length of the portion of the pressing member 58 protruding from the screw hole portion 572 is adjusted according to a degree of change in position of the detection object 95 so that an output characteristic of the heat flux sensor 10 can be optimized in the detection of a change in position of the detection object 95. Therefore, the fifth embodiment yields the same effects as the effects (a) and (c) to (f) of the first embodiment, and can further improve detection accuracy of a change in position of the detection object 95.

Furthermore, in the position detection device 5, the pressing member 58 that can abut the end surface 924 of the mount table 92 is located on the upper side of the elastic member 17 and is provided on the upper side of the elastic member 17 via the screw hole portion 572. Accordingly, an acting force caused by a change in position of the detection object 95 acts from immediately above the elastic member 17, and thus a minute change in position of the mount table 92 can be detected. This makes it possible to further improve detection accuracy of a change in position of the detection object 95.

Sixth Embodiment

Figure 12:
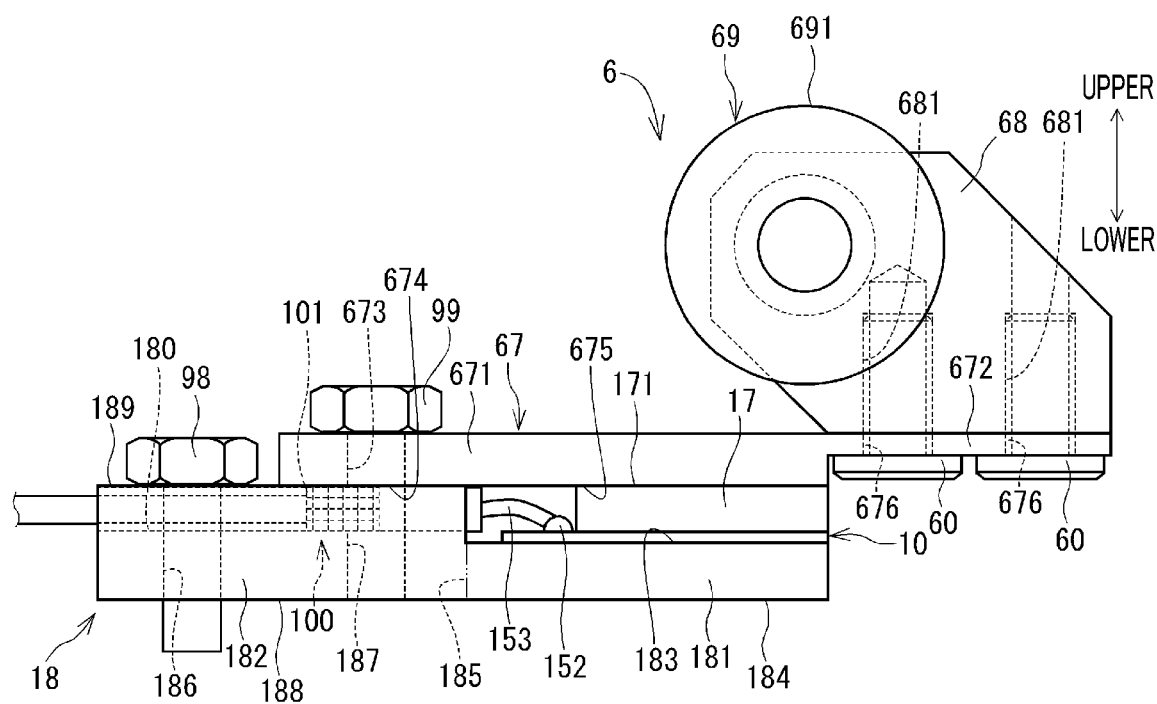
FIG. 12 is a schematic diagram of a position detection device according to a sixth embodiment.

Next, a position detection device according to a sixth embodiment will be described with reference to FIG. 12. The sixth embodiment differs from the first embodiment in the configuration of the following portion. Portions substantially the same as those of the first embodiment are given the same reference numerals, and description of such portions is omitted.

A position detection device 6 according to the sixth embodiment includes the base member 18, a first support member 67 as the "following portion", a second support member 68 as the "following portion", a roller 69 as the "following portion" and a "rotation member", the elastic member 17, and the heat flux sensor 10. In FIG. 12, an upper side and a lower side in the direction of gravity when the position detection device 6 is applied to the position detection system 9 are referred to as an "upper" side in the vertical direction and a "lower" side in the vertical direction, respectively.

The first support member 67 has a fixing portion 671 and an extending portion 672. The fixing portion 671 and the extending portion 672 are integrally formed of a conductive and elastically deformable material. The first support member 67 supports the second support member 68.

The fixing portion 671 is a portion having a substantially flat plate shape. The fixing portion 671 is provided on the end surface 189 of the support portion 182 and on the elastic member 17. A portion provided on the end surface 189, of the fixing portion 671, has a through hole 673 through which the two bolts 99 can be inserted. The fixing portion 671 is fixed to the base member 18 by the bolts 99 inserted into the through holes 673 and 187. The first support member 67 (the following portion) has a second surface constituting a housing space. A portion provided on the elastic member 17, of the fixing portion 671, has an surface 675. The surface 675 serves as the second surface. The surface 675 abuts the surface 171 of the elastic member 17. The surface 675 is adhered to the surface 171, for example, by using an adhesive.

The extending portion 672 is a portion having a substantially flat plate shape and formed to extend in the horizontal direction from an end having the end surface 675 of the fixing portion 671. The extending portion 672 has a through hole 676 through which a connecting member 60 connecting the first support member 67 to the second support member 68 can be inserted.

The second support member 68 is provided on the upper side of the extending portion 672. The second support member 68 is formed to extend toward the upper direction. The second support member 68 has a screw hole 681 to which the connecting member 60 can be screw-fastened.

The second support member 68 is fixed to the extending portion 672 by the connecting member 60 inserted into the screw hole 681 and the through hole 676. The roller 69 is provided at an end on a side opposite to the side connected to the extending portion 672, of the second support member 68.

The roller 69 is rotatably provided on the second support member 68. The roller 69 has, for example, a columnar shape. A wall surface 691 on an outer side in a radial direction of the roller 69 can abut the end surface 924 of the mount table 92.

In the position detection device 6 according to the sixth embodiment, the roller 69 that can abut the end surface 924 of the mount table 92 is rotatably provided. Accordingly, even when the detection object 95 moves in the horizontal direction, it is possible to maintain the state where the roller 69 abuts the mount table 92. Therefore, the sixth embodiment yields the same effects as the effects (a) and (c) to (f) of the first embodiment, and can detect a change in position of the detection object 95 moving in the horizontal direction.

Seventh Embodiment

Figure 13:
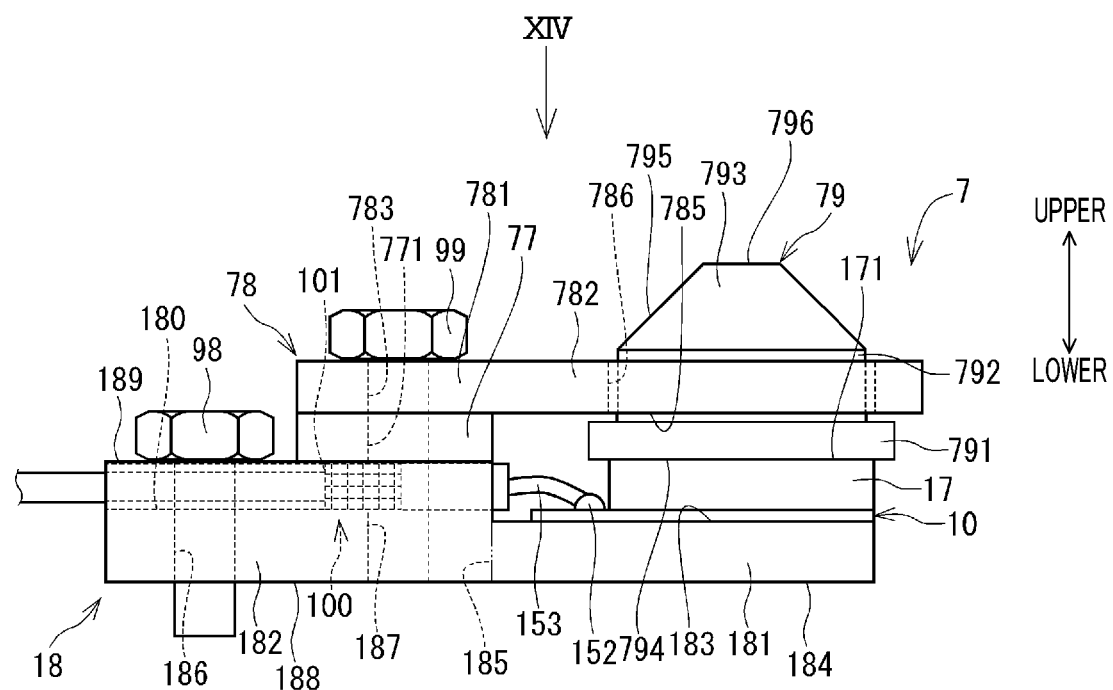
FIG. 13 is a schematic diagram of a position detection device according to a seventh embodiment.
Figure 14:
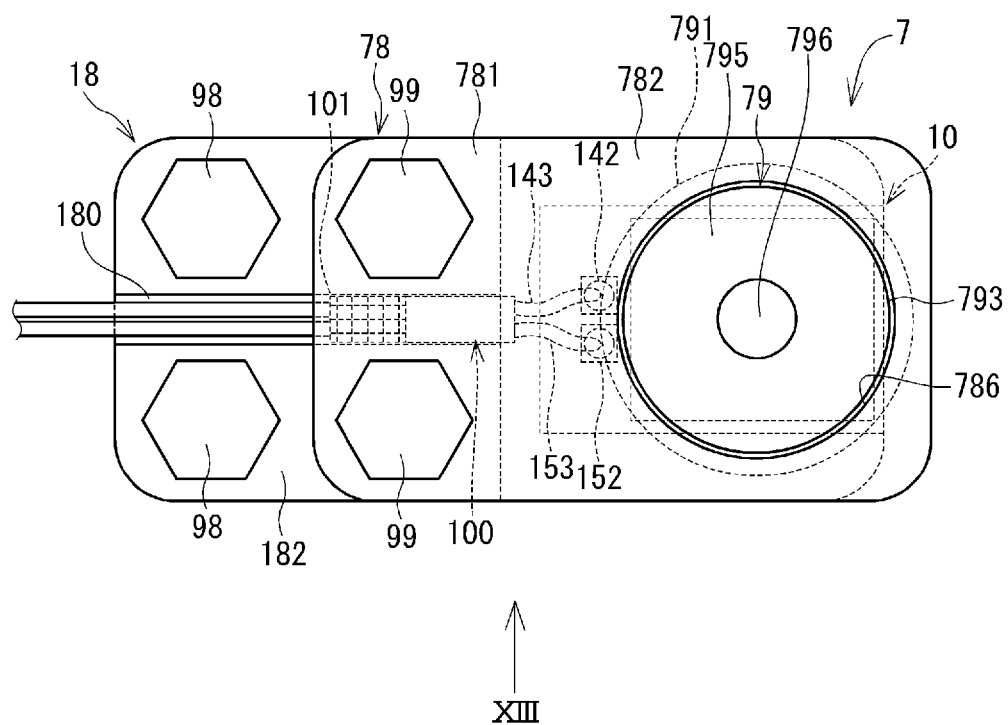
FIG. 14 is a diagram as viewed from a direction indicated by arrow XIV in FIG. 13.

Next, a position detection device according to a seventh embodiment will be described with reference to FIGS. 13 and 14. The seventh embodiment differs from the first embodiment in the configuration of the following portion. Portions substantially the same as those of the first embodiment are given the same reference numerals, and description of such portions is omitted.

A position detection device 7 according to the seventh embodiment includes the base member 18, a first support member 77, a second support member 78, a pressing member 79 as the "following portion" and the "movable portion", the elastic member 17, and the heat flux sensor 10. In FIG. 13, an upper side and a lower side in the direction of gravity when the position detection device 7 is applied to the position detection system 9 are referred to as an "upper" side in the vertical direction and a "lower" side in the vertical direction, respectively.

The first support member 77 is provided on the end surface 189 of the support portion 182. The first support member 77 has a through hole 771 through which the two bolts 99 can be inserted.

The second support member 78 has a fixing portion 781 and a guide portion 782.

The fixing portion 781 is a portion having a substantially flat plate shape. The fixing portion 781 is provided on the upper side of the first support member 77. The fixing portion 781 has a through hole 783 through which the two bolts 99 can be inserted. The fixing portion 781 is fixed to the base member 18 via the first support member 77 by the bolts 99 inserted into the through holes 783, 771, and 187.

The guide portion 782 is provided on the heat flux sensor 10 side of the fixing portion 781. An end surface 785 on the lower side of the guide portion 782 is formed at a position apart from the surface 171 of the elastic member 17. The guide portion 782 has a through hole 786 through which the pressing member 79 can be inserted. The through hole 786 is formed to be located on the upper side of the elastic member 17.

The pressing member 79 is a member having a substantially circular cylindrical shape and formed as a separate member from the first support member 77 and the second support member 78. The pressing member 79 has an acting portion 791, an insertion portion 792, and an abutting portion 793.

The acting portion 791 is a portion having a disk shape and provided between the guide portion 782 and the elastic member 17. The acting portion 791 is formed to have an outer diameter larger than an inner diameter of the through hole 786. The pressing member 79 (the following portion) has a second surface constituting a housing space. The acting portion 791 has a surface 794 of the lower side thereof, which serves as the second surface. The end surface 794 is adhered to the surface 171 of the elastic member 17, for example, by using an adhesive.

The insertion portion 792 is a member having a circular cylindrical shape and provided on the upper side of the acting portion 791. The insertion portion 792 is inserted through the through hole 786. Accordingly, movement in the horizontal direction of the pressing member 79 is restricted by the guide portion 782.

The abutting portion 793 is a portion having a truncated cone shape and provided on the upper side of the insertion portion 792. The abutting portion 793 has a side surface 795 inclined with respect to the vertical direction and an end surface 796 substantially perpendicular to the vertical direction. The side surface 795 and the end surface 796 are formed to be able to abut the end surface 924 of the mount table 92.

In the position detection device 7 according to the seventh embodiment, the pressing member 79 is formed as a separate member from the first support member 77 and the second support member 78. Accordingly, even when the first support member 77 or the second support member 78 is elastically deformed, the pressing member 79 is not pressed back by a reaction force of the elastic deformation. Thus, the pressing member 79 can allow an acting force caused by a change in position of the detection object 95 to stably and perpendicularly act on the elastic member 17. Therefore, the seventh embodiment yields the same effects as the effects (a), (c), (d), and (f) of the first embodiment, and can further improve detection accuracy of a change in position of the detection object 95.

Furthermore, the pressing member 79 has the side surface 795 inclined with respect to the vertical direction and the end surface 796 substantially perpendicular to the vertical direction. This makes it possible to prevent the pressing member 79 from partial contact with the mount table 92. Therefore, a change in position of the detection object 95 and an output voltage of the heat flux sensor 10 have a linear relationship, and thus the change in position of the detection object 95 can be easily calculated.

Other Embodiments

In the above embodiments, a change in position of the driving device is detected by the position detection system to which the position detection device is applied. A change in position of the driving device may be detected only by the position detection device.

In the above embodiments, the position detection device detects a change in position, for example, of the driving device such as a robot or a single-axis loader. However, the target for which a change in relative position can be detected by the position detection device is not limited to this. For example, the target may be a device driven by a driving force supplied from the outside.

In the above embodiments, by using the adhesive, the pressing member is adhered to the elastic member, the elastic member is adhered to the heat flux sensor, and the heat flux sensor is adhered to the base member. However, the method of adhering these members is not limited to this. An adhesive sheet may be used to adhere these members. The members only need to be provided so that the elastic member is deformed according to deformation of the pressing member and the heat flux sensor can detect movement of heat caused by the deformation of the elastic member.

The sealing portion of the first embodiment may be applied to the second to seventh embodiments.

Figure 15:
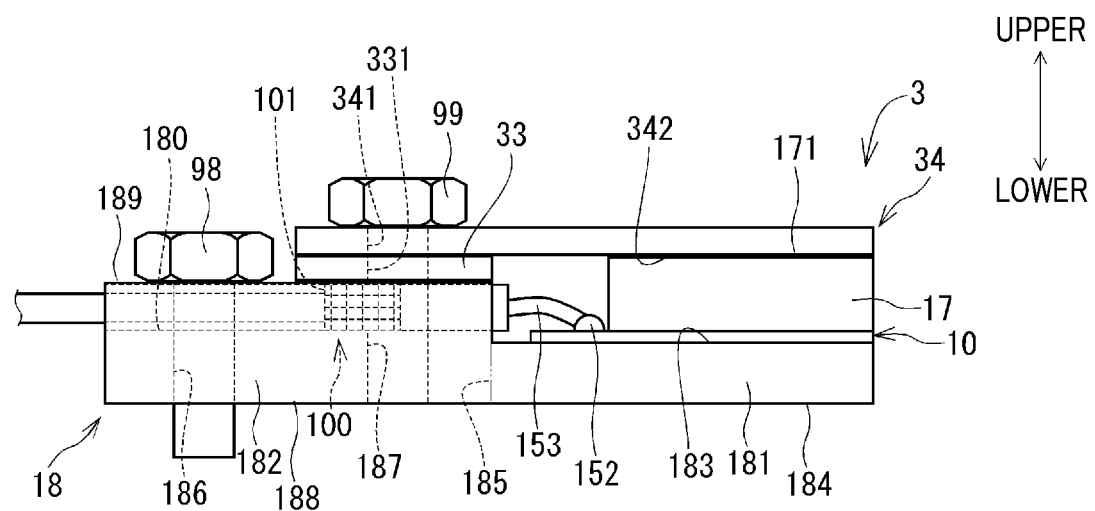
FIG. 15 is a schematic diagram of a position detection device according to another embodiment.

In the third embodiment, the pressing member has the fixing portion and the thin plate portion that has a smaller thickness in the vertical direction than the fixing portion, and the fixing portion is integrally formed with the thin plate portion. As shown in FIG. 15, however, a reinforcing member may be provided between the pressing member having a relatively small thickness in the vertical direction and the base member.

A modified example of the third embodiment shown in FIG. 15 will be described.

The position detection device 3 shown in FIG. 15 includes the base member 18, a reinforcing member 33, a pressing member 34 as the "following portion", the elastic member 17, and the heat flux sensor 10. In FIG. 15, an upper side and a lower side in the direction of gravity when the position detection device 3 is applied to the position detection system 9 are referred to as a "upper" side in the vertical direction and a "lower" side in the vertical direction, respectively.

The reinforcing member 33 is a member having a substantially flat plate shape, and is provided on the end surface 189 of the support portion 182. The reinforcing member 33 has a through hole 331 through which the two bolts 99 can be inserted.

The pressing member 34 is provided on the upper side of the reinforcing member 33. The pressing member 34 is made of a conductive and elastically deformable material so that a thickness in the vertical direction is relatively small. The pressing member 34 has a through hole 341 through which the two bolts 99 can be inserted. Accordingly, the reinforcing member 33 and the pressing member 34 are fixed to the base member 18 by the bolts 99 inserted into the through holes 341, 331, and 187. The pressing member 34 has an end surface 342 that is on the lower side and at a position apart from a portion at which the through hole 341 is formed. The end surface 342 is adhered to the surface 171 of the elastic member 17, for example, by using an adhesive.

With such a configuration, the position detection device 3 shown in FIG. 15 can also yield the same effects as the effects of the third embodiment The pressing member of the first and third embodiments, the arm portions of the second embodiment, the support member of the fourth and fifth embodiments, and the first support member of the sixth embodiment are made of an elastically deformable material and adhered to the elastic member. Accordingly, the elastic member is returned to its original shape by not only the restoring force of the elastic member itself but also the restoring force to return to its original shape of the member adhered to the elastic member. Thus, the present disclosure can increase a range in which a change in position of the detection object is detectable, by changing rigidity, a thickness, or the like of the material forming the member adhered to the elastic member according to characteristics of an acting force such as a magnitude of the acting force caused by a change in position of the detection object and a cycle of vibration associated with the change in position of the detection object.

In the above embodiments, the position detection device is fixed to the stage portion by the bolts. The method of fixing the position detection device to the stage portion is not limited to this. By providing the stage portion with a positioning pin or a groove for attaching the position detection device, reproducibility can be further improved.

In the above embodiments, the height of the support table that supports the position detection device is adjusted by the slider. The height may be adjusted by a screw or the like. Alternatively, support tables having different heights may be prepared.

In the above embodiments, the elastic member is located on the upper side of the heat flux sensor. However, the positional relationship of the base member, the pressing member, the elastic member, and the heat flux sensor is not limited to this. These members may be provided to detect a change in position of the driving device located on the lower side of the heat flux sensor.

In the above embodiments, the elastic member is made of Viton. The elastic member only needs to be made of a material, such as another type of rubber, resin, or metal, that generates heat at the time of contraction and absorbs heat at the time of expansion.

The present disclosure is not limited to the above embodiments, and can be applied to various embodiments without departing from the scope of the present disclosure.

The present disclosure has been described on the basis of the above embodiments. However, the present disclosure is not limited to the above embodiments and structures. The present disclosure encompasses various modifications and modifications within an equivalent scope. In addition, a category or range of thought of the present disclosure encompasses various combinations or forms and other combinations or forms including only one element, one or more elements, or one or less elements of those.

What is claimed is:

1. A position detection device for detecting a change in relative position of a detection object with respect to a reference portion, the position detection device comprising:
   a base portion that is immovable with respect to the reference portion;
   a following portion that is provided to be deformable or movable following relative movement of the detection object with respect to the reference portion;
   an expandable and contractible member that is provided between the base portion and the following portion, is made of a material expandable and contractible according to deformation or movement of the following portion, and generates heat during contraction and absorbs heat during expansion; and
   a heat flux detection section that is provided to be subjected to heat of the expandable and contractible member, and is configured to detect a heat flux that is a flow of heat between an inside and an outside of the expandable and contractible member,
   wherein the base portion and the following portion form a housing space therebetween, the housing space enabling the expandable and contractible member and the heat flux detection section to be housed therein.

2. The position detection device according to claim 1, wherein the following portion is made of an elastically deformable material.

3. The position detection device according to claim 1, wherein:
   the base portion is adhered to the heat flux detection section;
   the heat flux detection section is adhered to the expandable and contractible member; and
   the expandable and contractible member is adhered to the following portion.

4. The position detection device according to claim 1, further comprising a sealing portion that seals the expandable and contractible member and the heat flux detection section housed in the housing space.

5. The position detection device according to claim 1, wherein,
the base portion has a first surface constituting the housing space;
the following portion has a second surface constituting the housing space; and
the first and second surfaces have a changeable distance therebetween.

6. The position detection device according to claim 1, wherein the following portion includes a first movable portion and a deformable portion, the first movable portion being relatively movable with respect to the base portion following movement of the detection object while the movable portion abuts the expandable and contractible member, the deformable portion being made of an elastically deformable material and supporting the movable portion.

7. The position detection device according to claim 1, wherein,
the following portion comprises a length adjustable member that has a length configured to be adjustable to enable the length adjustable member of the following portion to abut the expandable and contradictable member and the detection object.

8. The position detection device according to claim 1, wherein the following portion includes a rotation member that is configured to be rotatable to enable the rotation member to abut the detection object.

9. The position detection device according to claim 1, wherein the following portion includes a second movable portion and a guide portion, the second movable portion being movable with respect to the base portion following movement of the detection object while the second movable portion abuts the expandable and contractible member, the guide portion being formed as a separate member from the movable portion and being configured to guide movement of the second movable portion.

10. The position detection device according to claim 1, further comprising a fastening member configured to fasten the following portion to the base portion.

11. The position detection device according to claim 1, further comprising a fixing member that fixes the base portion so that the base portion is relatively immovable with respect to the reference portion.

12. The position detection device according to claim 1, wherein at least one of the base portion and the following portion includes a wiring space configured to house an electric wiring of the heat flux detection section.

13. The position detection device according to claim 1, wherein at least one of the base portion or the following portion is made of a conductive material and electrically connected to a ground wire of the heat flux detection section.

* * * * *